United States Patent [19]

Röschlein et al.

[11] Patent Number: 4,514,743

[45] Date of Patent: Apr. 30, 1985

[54] INK JET FILTERED-CHAMBER PRINT HEAD

[75] Inventors: Rolf Röschlein, Paderborn-Elsen; Heinz Schulte, Paderborn-Sande, both of Fed. Rep. of Germany

[73] Assignee: Nixdorf Computer AG, Fed. Rep. of Germany

[21] Appl. No.: 598,509

[22] Filed: Apr. 9, 1984

[30] Foreign Application Priority Data

Apr. 12, 1983 [DE] Fed. Rep. of Germany ....... 3313156

[51] Int. Cl.[3] ............................................ G01D 15/18

[52] U.S. Cl. ............................................... 346/140 R

[58] Field of Search .............................. 346/75, 140 R

[56] References Cited

U.S. PATENT DOCUMENTS

| | | | |
|---|---|---|---|
| 4,149,172 | 4/1979 | Heinzl et al. | 346/140 R |
| 4,158,847 | 6/1979 | Heinzl et al. | 346/140 R |
| 4,233,610 | 11/1980 | Fischbeck et al. | 346/140 R |

*Primary Examiner*—E. A. Goldberg
*Assistant Examiner*—Gerald E. Preston
*Attorney, Agent, or Firm*—Krass & Young

[57] ABSTRACT

In a piezoelectrically-driven printing head for a dot-matrix ink printer, the ink canals (11) have a funnel-shaped enlargement (19) connected through a filter (18) to a common ink reservoir (16). The enlargements (19) increase the ink current cross-section in the area of the filter (18) and thereby increase the ink flow rate.

6 Claims, 1 Drawing Figure

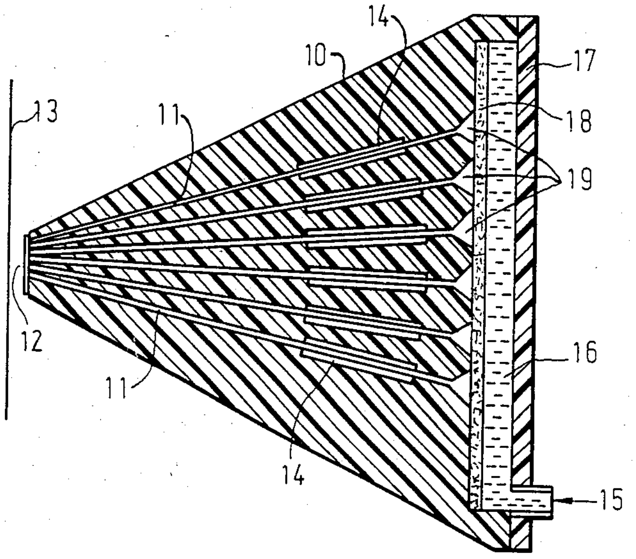
14
10
17
13
11
18
19
12
16
11
14
15

INK JET FILTERED-CHAMBER PRINT HEAD

INTRODUCTION

The invention relates to a piezoelectrically driven print head for dot matrix ink printers with a plurality of print jets in the form of ink ducts receiving the printing fluid, which ducts are respectively enclosed by a piezoelectric drive element and are connected by way of a filter arrangement with an ink chamber common to them, wherein the ink ducts have a substantially greater length than the drive elements.

BACKGROUND

A print head of this type is known from German Pat. No. 2,543,451. Its ink ducts empty by their jet openings on the point of the print head in a grid-like distribution, by which it becomes possible, with a suitable selective triggering the piezoelectric drive element with electrical voltage pulses during a line-by-line movement of the print head, to record characters on a recording support. For this the piezoelectric drive elements in the form of little tubes, as a result of their being triggered with the voltage pulses, cause a corresponding pulse-like contraction of the ink ducts, by means of which pressure pulses are exerted on the ink present in the ink ducts, which in turn leads to the detaching of ink droplets at the jet openings of the ink ducts as well as to their being transferred to the recording support.

One disadvantage of the print heads of this type previously known is that the distance between the jet openings and the recording support cannot be increased at will and for the purpose of generating the most accurate possible mosaic characters can be only 0.5 to 1 mm at most. However there are application cases in which a greater distance from the recording support is required. An example of such an application case is the marking of bank deposit books in banking practice within the scope of an automatic accounting process. For this the page to be marked, depending on its position in the deposit book or on the number of marking operations already done, may be at a long distance or short distance from its print head or its jet opening. Within a distance range which may be 3 mm or more, however, an always constant printing accuracy must be ensured.

If the ink droplets are to be moved with constant accuracy over a long distance to the recording support after emerging from the jet openings, then the pressure pulses causing this must be generated with a higher intensity in order to ensure a droplet flow in a straight line. For this the amplitude of the control voltage pulses applied to the piezoelectric drive elements can be increased, but relatively low limits are imposed on such an increase, which are probably due to the mechanical behavior of the drive element itself and do not lead to the desired result but rather have the effect of greater printing inaccuracies.

SUMMARY OF THE INVENTION

The problem of the invention therefore consists in supplying a construction for a print head of the type mentioned at the start which will make it possible to generate recordings with satisfactory accuracy over greater distances than previously without the necessity of making allowance for impairment of the print accuracy due to increased control voltage amplitudes.

This problem is solved according to the invention for a print head of the type mentioned at the start by having the filter arrangement consist of only a layer of a capillary filter material and by having each ink duct show a funnel-shaped enlargement bordering directly on this layer.

In the previously known print head, a choke plate and a close-mesh grid are provided as the filter arrangement between the ink ducts and the ink chamber common to them, which arrangement is to prevent air from going through the ink ducts into the ink chamber. The choke plate contains a very narrow passage opening for each ink duct, which openings are to dissipate peak pressures in the ink supply system and ensure a mutual neutralizing of the pressure actions of the ink ducts with one another.

In a print head according to the invention, however, no special choke plate is used, but rather only a filter arrangement in the form of a layer of a capillary filter material is provided between the ink ducts and the ink chamber. However in addition each ink duct has a funnel-shaped enlargement bordering on this layer. It has been found that with this arrangement a considerably better utilization of the energy of the pressure pulses generated by the piezoelectric drive elements is possible, which causes the ink droplets emerging at the jet openings to be able to fly across a considerably greater distance to the recording support while maintaining their predetermined path.

This is attributable to the fact that the funnel-shaped, that is continuous enlargements of the ink ducts bordering on the filter layer also result in a corresponding increase in the flow cross section of the capillary filter material, whereby the flow resistance is reduced for each of these cross sections. Since also there is no choke plate with narrow passage openings, there is a considerable increase in the flow rate. It is noted here that despite the lack of a choke plate, practically no harmful effects of peak pressures occur and there is a sufficient neutralization of the pressure actions in the ink ducts by one another. The funnel shape of the enlargements prevents transition edges and therefore harmful reflections.

Particularly advantageous results are achieved in practice when the filter material shows a mesh spacing of about 0.035 mm and a thickness of about 0.05 mm. This dimensioning seems to ensure a particularly good capillary action of the filter material for the continuous supplying of the individual ink ducts with ink, combined with an adequate filter action.

Recesses shaped in very different ways in the part containing the ink ducts may be provided as the funnel-shaped enlargements of the ink ducts. Thus for example it is possible to provide hemispherical, hyperbolic or elliptical recesses in the faces on which the ink ducts open and which are opposite the filter layer. However an embodiment has proven particularly advantageous in which enlargements of the ink ducts are built in conical shape with an opening angle of about 60′.

This construction in turn gives an advantageous dimensioning of the enlargements when these show a diameter of about 3 mm where they go into the filter material. This dimension then has quite a favorable ratio of the diameter of the ink ducts, which is ordinarily of the order of 0.5 to 0.7 mm at the point of opening into the filter layer.

In the previously known print head an air pocket is enclosed in the ink chamber which is common to all the ink ducts, for the additional damping of pressure fluctuations. No such air pocket is required in a print head according to the invention, which means that the ink chamber is exclusively filled with ink.

BRIEF DESCRIPTION OF THE DRAWING

The single FIGURE illustrates an embodiment of the invention.

DETAILED DESCRIPTION OF ILLUSTRATIVE EMBODIMENT

In the FIGURE a print head according to the invention is diagrammatically represented in a cross section as an embodiment example. This print head consists essentially of a plastic part 10 which is constructed in conical shape and into which the ink ducts 11 are inserted which converge at the left tip of the part 10 and there empty with jet openings 12. At a distance from the tip of the part 10 is arranged a recording support 13 on which the ink droplets emerging from the jet openings 12 can record characters due to the mosaic-like distribution of the jet openings 12 when there is a relative motion between the part 10 and the recording support 13.

The ink droplets are produced by having tubular piezoelectric drive elements 14 which surround the ink ducts 11 selectively triggered in a rapid sequence with voltage pulses, in which way they become deformed in the manner of a contraction and generate a pressure pulse in the respective ink duct 11 which pulse acts on the ink present in the ink duct 11 in such a way that the ink becomes detached in droplet form at the jet openings 12 and is shot onto the recording support 13.

An ink supply system is provided for supplying the ink ducts 11 with ink, the reservoir of which system is not represented in the FIGURE. The ink is fed from such a reservoir at 15 into the print head and goes into an ink chamber 16 common to all the ink ducts, which chamber is formed between the part 10 and a rear end plate 17 which is joined to the part 10 in a sealing manner and is for example screwed onto it (not represented). The common ink chamber 16 is so narrow that the ink fed in at 15 rises up in it by capillary action and fills it full. In the practical design of a print head the width of the ink chamber may for example be 0.1 to 0.3 mm.

The ink chamber 16 is bounded on its left side by a layer 18 of a filter material which for example may consist of a fibrous plastic material with a mesh spacing of 0.035 mm. The thickness of this layer 18 may be about 0.05 to 0.3 mm.

In the FIGURE it is seen that the individual ink ducts 11 are more than twice as long as the drive elements 14 and are connected with the layer 18 of the filter material by way of one funnel-shaped enlargement 19 each, which in the embodiment example represented is constructed in cone shape. The opening angle of this funnel shape may be 60′ for example. The ink ducts 11 may for example be 35 mm long while the drive elements 14 are then about 12 mm long.

If the piezoelectric drive element 14 of an ink duct 11 is triggered with an electric voltage pulse, then a pressure pulse is generated in the ink duct 11 within the ink with which it is filled, which is propagated in the direction of the jet opening 12, but also in the opposite direction, namely to the layer 18 of the filter material. The pressure pulse causes the detachment of an ink droplet on the duct opening 12 as well as its movement out to the recording support 13. Through the enlargement 19 and the resulting increase in the flow cross section of the filter material layer 18 there is a greater flow rate of the ink than in comparable known print heads, which achieves the result that the recording support 13 can be at a correspondingly greater distance from the jet openings 12. In practice it has been found that this distance may be of the order of 3 mm.

Also the fact that the piezoelectric drive elements 14 surround the ink ducts 11 at a point which is arranged as close as possible to the enlargements 19, while the remaining free length of the ink ducts 11 lies in front of the drive elements 14, seems of importance for this.

We claim:

1. Piezoelectrically driven print head for dot matrix ink printers with a plurality of print jets in the form of ink ducts receiving the printing fluid, which ducts are respectively enclosed by a piezoelectric drive element and are connected by way of a filter arrangement with an ink chamber common to them, wherein the ink ducts have a substantially greater length than the drive elements, characterized in that the filter arrangement consists of only a layer (18) of a capillary filter material and in that each ink duct (11) shows a funnel-shaped enlargement (19) bordering directly on this layer (18).

2. Print head as claimed in claim 1, characterized in that the filter material (18) shows a mesh opening of about 0.035 mm and a thickness of about 0.05 mm.

3. Print head as claimed in claim 1, characterized in that the enlargements (19) in the ink ducts (11) are built conical in shape with an opening angle of about 60′.

4. Print head as claimed in claim 3, characterized in that the enlargements (19) show a diameter of about 3 mm where they go into the filter material (18).

5. Print head as claimed in claim 1, characterized in that the ink chamber (16) is exclusively filled with ink.

6. Print head as claimed in claim 1 characterized in that the piezoelectric drive elements (14) are arranged near the enlargements (19) of the ink ducts (11).

* * * * *